(12) United States Patent
Inoue et al.

(10) Patent No.: US 8,571,816 B2
(45) Date of Patent: Oct. 29, 2013

(54) ELECTROMAGNETIC FLOW METER

(75) Inventors: Taka Inoue, Tokyo (JP); Ichirou Mitsutake, Tokyo (JP)

(73) Assignee: Azbil Corporation, Tokyo (JP)

( * ) Notice: Subject to any disclaimer, the term of this patent is extended or adjusted under 35 U.S.C. 154(b) by 371 days.

(21) Appl. No.: 13/089,418

(22) Filed: Apr. 19, 2011

(65) Prior Publication Data

US 2011/0264382 A1 Oct. 27, 2011

(30) Foreign Application Priority Data

Apr. 22, 2010 (JP) ................. 2010-098647

(51) Int. Cl.
*G01F 1/58* (2006.01)

(52) U.S. Cl.
USPC ............... 702/45; 73/861.16; 331/65; 702/38

(58) Field of Classification Search
USPC ................. 702/38, 45, 50, 57, 64; 73/861.12, 73/861.16, 861.17, 861.42; 166/250.01; 331/65

See application file for complete search history.

(56) References Cited

U.S. PATENT DOCUMENTS 4,253,093 A * 2/1981 Johanson et al. ............. 376/216
4,672,331 A 6/1987 Cushing

FOREIGN PATENT DOCUMENTS

| GB | 2152220 A | 7/1985 |
| GB | 2201785 A | 9/1988 |
| JP | 6-258111 A | 9/1994 |
| JP | 7-055519 A | 3/1995 |
| JP | 7-324959 A | 12/1995 |

OTHER PUBLICATIONS

European Patent Application No. 11163328.5: Extended European Search Report, dated Oct. 21, 2011.

* cited by examiner

*Primary Examiner* — John H Le
(74) *Attorney, Agent, or Firm* — Troutman Sanders LLP

(57) ABSTRACT

Gain switching is performed by a DC amplifying circuit. The DC amplifying circuit is provided with individual gain generating circuits and a gain selecting circuit, and saturation preventing circuits are provided in earlier stages than the individual gain generating circuits. The individual gain generating circuit generates a gain G1, the individual gain generating circuit generates a gain G2 (where G2>G1), and the individual gain generating circuit generates a gain G3 (where G3>G2). The gain selecting circuit selects, as a used gain generating circuit, one of the individual gain generating circuits, and sends the output thereof to an A/D converting circuit in a later stage. A gain switching instruction is sent to the DC amplifying circuit, which controls the enabling/disabling of the saturation preventing operations of the saturation preventing circuits and the selecting operation for the gain selecting circuit, to prevent the occurrence of saturation in the individual gain generating circuits that generate higher gains than the gain generated by the used gain generating circuit.

4 Claims, 10 Drawing Sheets

ELECTROMAGNETIC FLOW METER

CROSS REFERENCE TO RELATED APPLICATIONS

The present application claims priority under 35 U.S.C. §119 to Japanese Patent Application No. 2010-098647, filed Apr. 22, 2010, which is incorporated herein by reference.

FIELD OF TECHNOLOGY

The present invention relates to an electromagnetic flow meter for measuring a flow rate of a fluid having electrical conductivity in various types of process systems.

BACKGROUND OF THE INVENTION

Conventionally, in this type of electromagnetic flow meter, an excitation current with a polarity that switches alternatingly is supplied to an excitation coil that is disposed so that the direction wherein the magnetic field thereof is produced is perpendicular to the direction of flow of a fluid flowing within a measuring tube, and a signal EMF that is produced between a pair of electrodes that are disposed within the measuring tube, perpendicular to the magnetic field that is produced by the excitation coil, is detected, and this signal EMF that is produced between the electrodes is differentially amplified to be an AC flow rate signal, where this AC flow rate signal is further amplified, sampled, and subjected to the signal processing to produce a measured flow rate.

This type of electromagnetic flow meter can be broadly categorized into battery-type electromagnetic flow meters, two-wire-type electromagnetic flow meters, and four-wire-type electromagnetic flow meters, based on differences in the driving power supply systems. Additionally, these electromagnetic flow meters have the property of having high measurement accuracy because the signal EMF that is produced between the electrodes is larger in accordance with the flow of the excitation current.

Because the four-wire-type electromagnetic flow meter has electric power supplied to the electromagnetic flow meter through two power supply wires that are separate from the two signal wires, it is possible to increase the excitation current flowing in the excitation coil regardless of the flow rate being measured. In contrast, in the two-wire-type electromagnetic flow meter, electric power that has a self-linking effect is generated from the 4 to 20 mA electric current signal that is sent through the two signal wires, and thus it is not possible to increase the excitation current that can flow in the excitation coil. Moreover, in the battery-type electromagnetic flow meter, the power for driving depends on the built-in battery power supply, and thus the excitation current, of necessity, must be small.

In this way, the excitation current in a two-wire-type electromagnetic flow meter or in a battery-type electromagnetic flow meter is a small electric current when compared to that of the four-wire-type electromagnetic flow meter, and thus the signal EMF that is obtained between the electrodes is smaller. Because of this, the gain in the signal amplifying circuit in the two-wire-type electromagnetic flow meter and the battery-type electromagnetic flow meter is set so as to be large compared to that of the four-wire-type electromagnetic flow meter. Additionally, the signal EMF that is produced between the electrodes has a magnitude that increases with an increase in the flow rate (the speed of flow) of the fluid being measured, and thus switching the gain of the signal amplifying circuit in accordance with the flow rate, or in other words, having the gain the low when the flow rate is high and having the gain the high when the flow rate is low, makes it possible to increase the accuracy depending on the range of the flow rate being measured.

FIG. 10 illustrates schematically an electromagnetic flow meter that is provided with a function for switching automatically the gain of the signal amplifying circuit in accordance with the flow rate (See, for example, Japanese Unexamined Patent Application Publication H6-258111). In this figure: 100 is a detecting device for receiving a magnetic excitation electric current Iex, applying a magnetic field to a fluid that flows within a measuring tube 1C, and detecting the signal EMF that is produced; and 200 is a converting device for not only applying the magnetic excitation electric current Iex to the detecting device 100, but also processing the signal EMF from the detecting device 100 to measure the flow rate of the fluid flowing within the measuring tube 1C.

In this electromagnetic flow meter, the converting device 200 has a differential amplifying circuit 2; an AC amplifying circuit 3; a sample hold circuit 4; a DC amplifying circuit 5; an A/D converting circuit 6; a processing portion 7; and a magnetic excitation circuit 8. Additionally, the detecting device 100 is provided with: a magnetic excitation coil 1D arranged so that the direction in which the magnetic field thereof is produced is perpendicular to the direction of flow of the fluid flowing within the measuring tube 1C; and a pair of electrodes 1A and 1B disposed perpendicular to the direction of flow of the fluid flowing within the measuring tube 1C and to the direction of the magnetic field produced by the magnetic excitation coil 1D.

In this electromagnetic flow meter, the magnetic excitation circuit 8 outputs a square wave AC magnetic excitation electric current Iex of a specific frequency based on an instruction from the processing portion 7. The magnetic excitation coil 1D is excited magnetically by the magnetic excitation electric current Iex from the magnetic excitation circuit 8, to produce a magnetic field, where the magnetic field that is produced is applied to the fluid flowing within the measuring tube 1C. This produces a signal EMF between the electrodes 1A and 1B with an amplitude that is in accordance with the speed of flow of the fluid. The signal EMF that is produced between the electrodes 1A and 1B is inputted into the differential amplifying circuit 2.

The differential amplifying circuit 2 performs differential amplification on the signal EMF produced between the electrodes 1A and 1B, to produce an AC flow rate signal. This AC flow rate signal is amplified by the AC amplifying circuit 3, and applied to the sample hold circuit 4. The sample hold circuit 4 samples the AC flow rate signal that is amplified by the AC amplifying circuit 3, to produce a DC flow rate signal. This DC flow rate signal is amplified by the DC amplifying circuit 5, and applied to A/D converting circuit 6. The A/D converting circuit 6 converts into a digital signal the DC flow rate signal that has been amplified by the DC amplifying circuit 5, and sends it to the processing portion 7. The processing portion 7 calculates the flow rate of the fluid flowing within the measuring tube 1C from the digital signal from the A/D converting circuit 6, and outputs the calculated flow rate as the measured flow rate. Additionally, the processing portion 7 switches the gain in the AC amplifying circuit 3 in accordance with the calculated measured flow rate, that is, switches the gain that is applied to the AC flow rate signal from the differential amplifying circuit 2. In this case, there is a low gain when the measured flow rate is high, and a high gain when the measured flow rate is low.

However, in the conventional electromagnetic flow meter illustrated in FIG. 10, the gain of the AC amplifying circuit 3, which is a stage prior to the sample hold circuit 4, is switched, and thus when low frequency noise, or the like, is produced when there is a high gain when the flow rate is low (that is, when low frequency noise is produced in, for example, a case wherein a solid object within the flow strikes the measuring electrode), there is an increased likelihood that the operational amplifier in the AC amplifying circuit 3 will become saturated, and thus there is the risk that there will be error in the measured flow rate due to the occurrence of saturation.

The present invention was created in order to solve the problem as set forth above, and the object thereof is to provide an electromagnetic flow meter able to increase the accuracy of the measured flow rate, without producing saturation.

SUMMARY OF THE INVENTION

In order to achieve such an object, the present invention is an electromagnetic flow meter comprising: a magnetic excitation coil arranged so that the direction in which the magnetic field thereof is produced is perpendicular to the direction of flow of a fluid flowing within a measuring tube; magnetic excitation means for providing a magnetic excitation electric current to the magnetic excitation coil with the polarity thereof switching alternatingly; a pair of electrodes disposed within the measuring tube perpendicular to the direction of flow of the fluid flowing within the measuring tube and to the direction of the magnetic field produced by the magnetic excitation coil; differential amplifier for performing differential amplification of a signal EMF produced between the electrodes, to produce an AC flow rate signal; AC amplifier for amplifying the AC flow rate signal from the differential amplifier; sampler for sampling the AC flow rate signal that has been amplified by the AC amplifier, to produce a DC flow rate signal; DC amplifier for amplifying the DC flow rate signal from the sampler; A/D converter for converting into a digital signal the DC flow rate signal amplified by the DC amplifier; and processor for calculating a flow rate of the fluid flowing within the measuring tube from the digital signal converted by the AD converter; wherein the DC amplifier are provided with: first through Nth (where N≥2) individual gain generator for inputting individually the DC flow rate signal from the sampler and for applying, to the DC flow rate signal, the gain produced thereby, established so that the gains of the first through Nth individual gain generators applied to the DC flow rate signal are as sequentially larger values; gain selector for selecting, as the DC flow rate signal to the A/D converter, one of the outputs from the first through Nth individual gain generator; and saturation preventer for preventing the occurrence of saturation in a later-stage individual gain generator, connected to all of the earlier-stage individual gain generator of the first through Nth individual gain generator except for the first individual gain generator; and wherein: the processor are provided with controller for controlling enabling/disabling of the saturation preventing operation of the saturation preventer in the DC amplifier, and for controlling a selecting operation of the gain selector, based on the calculated flow rate of the fluid.

In the present invention, if, for example, N=3, the DC amplifier are provided with first individual gain generator for generating a gain G1, second individual gain generator for generating a gain G2 (wherein G2>G1), and third individual gain generator for generating a gain G3 (where G3>G2). Additionally, the saturation preventer for preventing the occurrence of saturation in the second individual gain generator is provided in an earlier stage than the second individual gain generator, and the saturation preventer for preventing the occurrence of saturation in the third individual gain generator is provided in an earlier stage than the third individual gain generator. If here the saturation preventer provided in the earlier stage than the second individual gain generator are defined as the second saturation preventer, and the saturation preventer provided in the earlier stage than the third individual gain generator are defined as the third saturation preventer, the enabling/disabling of the saturation preventing operations of the second saturation preventer and the third saturation preventer, and the selecting operation of the gain selector, are controlled by the controller.

For example, when controlling the selecting operation of the gain selector in the present invention, the individual gain generator for which the output is selected are defined as the used gain selector. Additionally, the saturation preventing operations of the saturation preventer connected to the individual gain generating circuits that generate gains that are less than or equal to the gain that is generated by the used gain generator are disabled and the saturation preventing operations of the other saturation preventer are enabled. In terms of the aforementioned example wherein N=3, if the second individual gain generator are defined as the used gain generator, then the gain preventing operation of the second saturation preventer, which are connected to the second individual gain generator, are disabled, and the gain preventing operation of the third saturation preventer, which are connected to the third individual gain generator, are enabled. In this case, the output from the second individual gain generator (the used gain generator) is selected as the DC flow rate signal to the A/D converter, but because the saturation preventing operation of the third saturation preventer is enabled, there will be no saturation, by the third individual gain generator, even when the value of the DC flow rate signal from the sampler is large.

In the present invention, the gain switching is performed by the DC amplifier, rather than by the AC amplifier. Additionally, the appropriate control of the enabling/disabling of the saturation preventing operations of the saturation preventer, and the selecting operation for the gain selector, by the DC amplifier makes it possible to prevent the occurrence of saturation in the individual gain generator that generate higher gains than the gain generated by the used gain generator. Doing so causes constant amplification by the AC amplifier and prevents the occurrence of saturation in both the AC amplifier and the DC amplifier, thereby enabling an increase in the accuracy of the measured flow rate.

Note that as an alternative example of the present invention, one may consider connecting saturation preventer to an earlier stage than the first individual gain generator. Additionally, in the present invention the enabling/disabling of the saturation preventing operations by the saturation preventer are controlled by the controller, and, for example control is performed with the state wherein the DC flow rate signal from the sampler is applied to the later-stage individual gain generator defined as the state wherein the saturation preventing operation is disabled, and with the state wherein a reference voltage, established in advance, is applied to the later-stage individual gain generator defined as the state wherein the saturation preventing operation is enabled, in this case, the value of the reference voltage in the saturation preventer is established as a value corresponding to the value of the DC flow rate signal to the used gain generator immediately prior to the saturation preventing operation thereof switching from enabled to disabled.

In the present invention, the gain switching is performed by the DC amplifier instead of the AC amplifier, and the DC amplifier are provided with first through Nth individual gain generator, gain selector, and saturation preventer, and enabling/disabling the saturation preventing operations of the saturation preventer in the DC amplifier, and the selecting operation for the gain selector, are performed based on the calculated flow rate, and thus the AC amplifier perform constant amplification and there is no saturation in either the AC amplifier or the DC amplifier, thus making it possible to improve the accuracy of the measured flow rate.

DETAILED DESCRIPTION OF THE INVENTION

Figure 1:
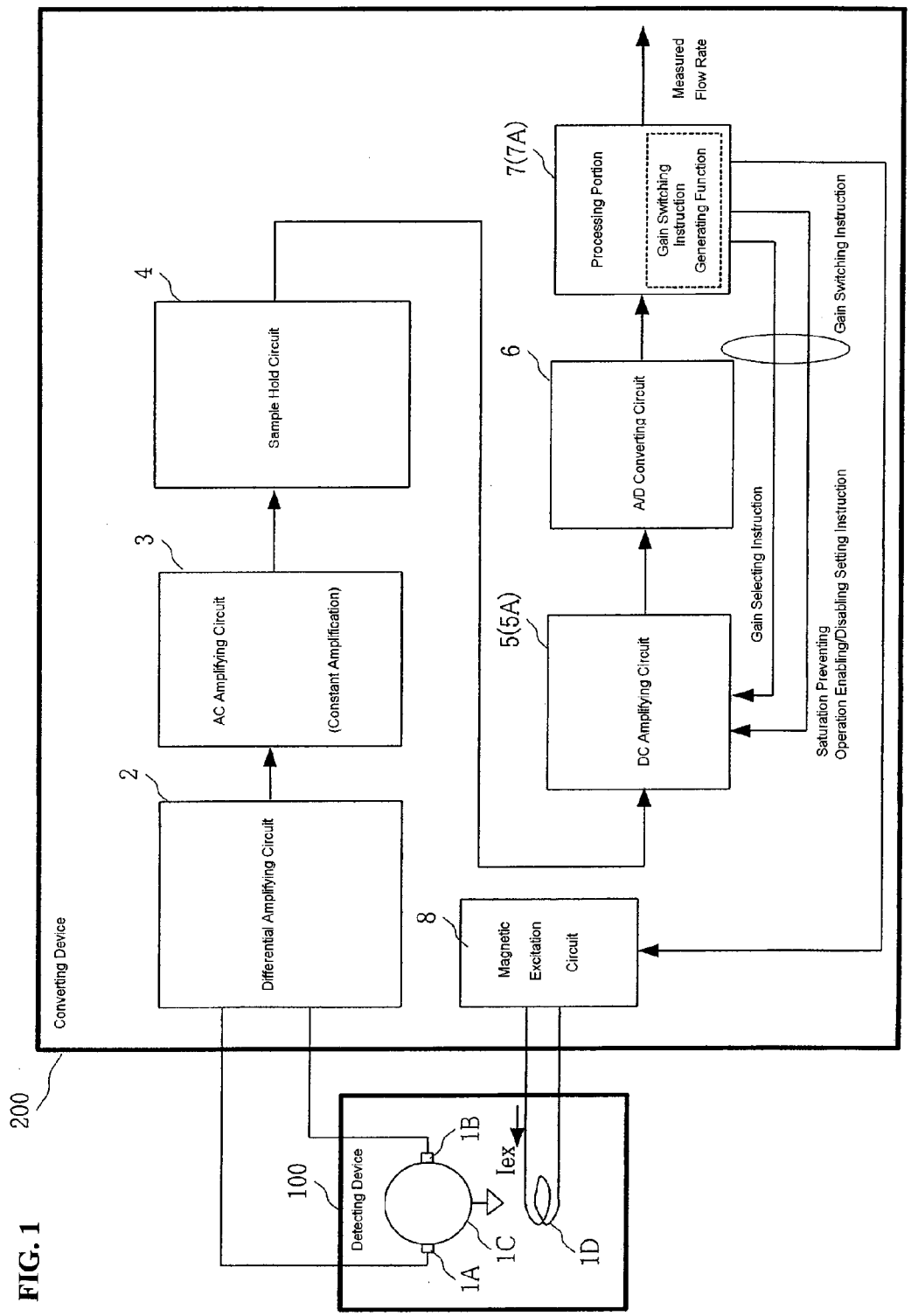
FIG. 1 is a diagram illustrating schematically an example of an electromagnetic flow meter according to the present invention.

An example is explained below in detail, based on the drawings. FIG. 1 is a diagram illustrating schematically an electromagnetic flow meter according to the present invention. In this figure, codes that are the same as those in FIG. 10 indicate identical or equivalent structural elements as the structural elements explained in reference to FIG. 10, and explanations thereof are omitted.

Figure 10:
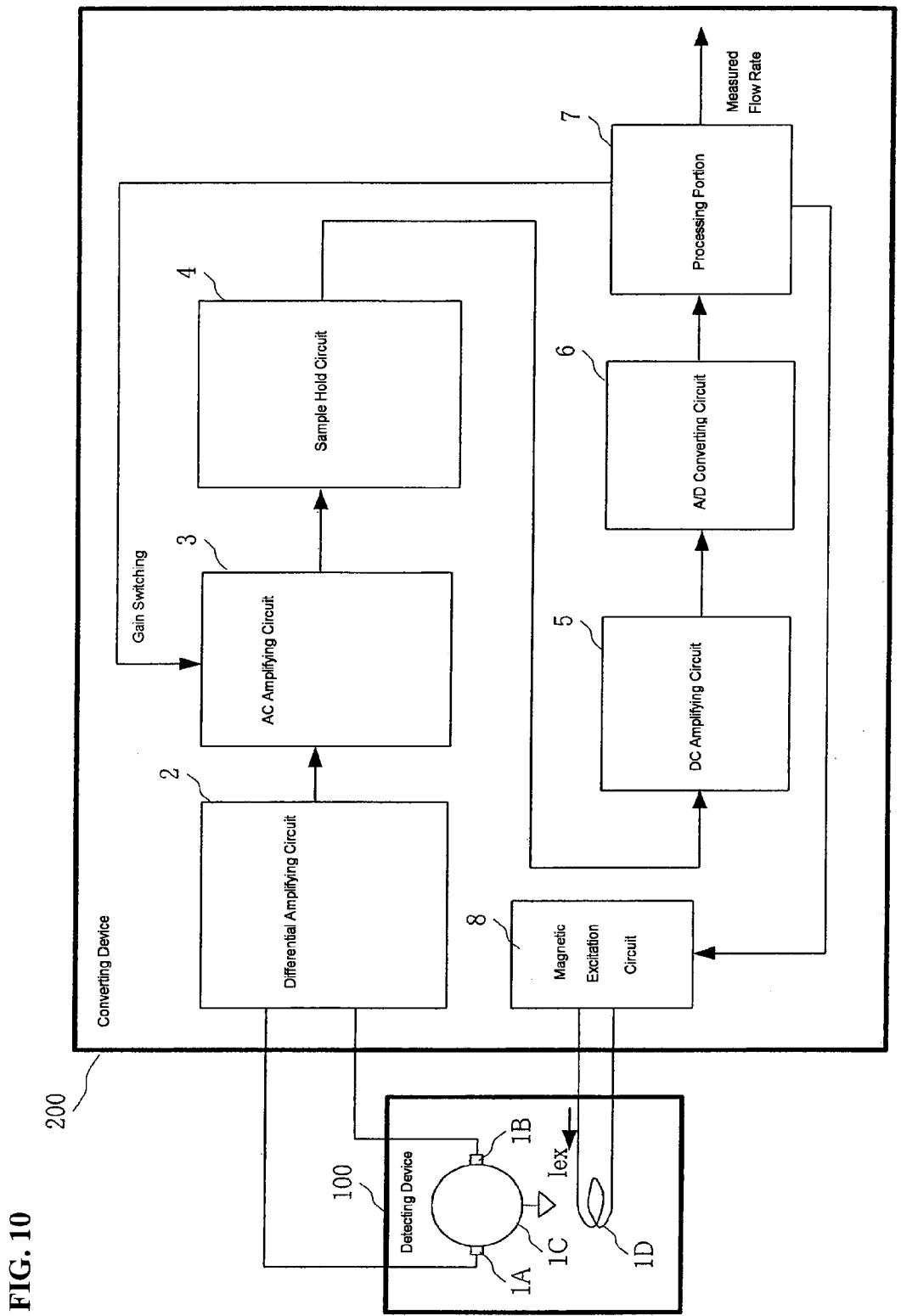
FIG. 10 is a diagram illustrating schematically a conventional electromagnetic flow meter.

In the conventional electromagnetic flow meter illustrated in FIG. 10, the gain switching in the AC amplifying circuit 3 was performed by a command from the processing portion 7. However, in the electromagnetic flow meter according to the example, constant amplification is performed in the AC amplifying circuit 3, and the gain switching is performed by the DC amplifying circuit 5 through a command from the processing portion 7.

Note that in FIG. 1 the DC amplifying circuit 5 is defined as 5A, to distinguish from the conventional DC amplifying circuit 5 illustrated in FIG. 10. Additionally the processing portion 7 is defined as 7A, to distinguish from the conventional processing portion 7 illustrated in FIG. 10.

Figure 2:
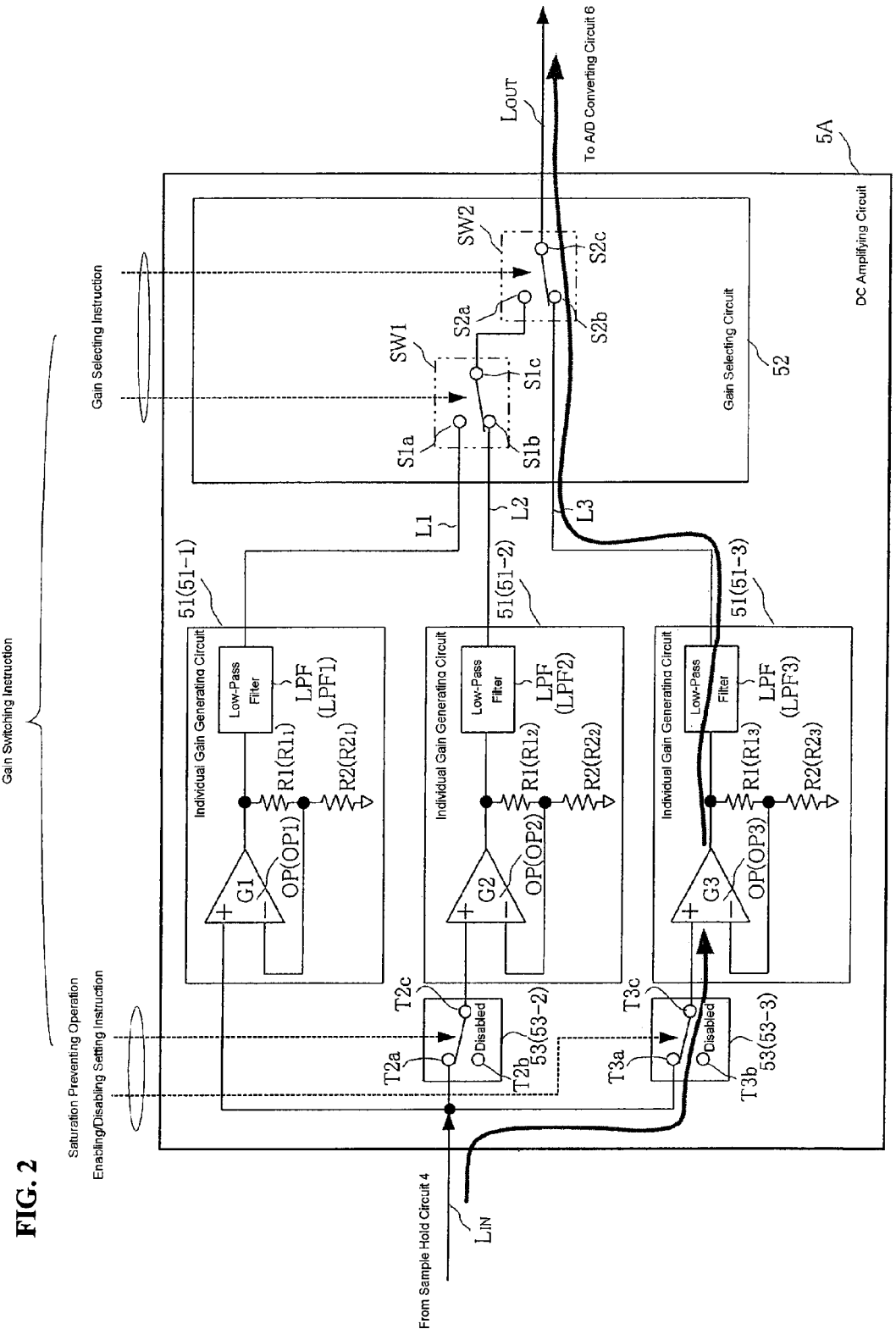
FIG. 2 is a diagram illustrating schematically the internal structure (in a state wherein the gain G3 is selected) of an example of a DC amplifying circuit in this electromagnetic flow meter.

Example Wherein No Reference Voltage is Set in the Saturation Preventing Circuit FIG. 2 illustrates schematically the internal structure of an example of the DC amplifying circuit 5A. In this example, the DC amplifying circuit 5A includes individual gain generating circuits 51-1 through 51-3 that each input the DC flow rate signal from the sample hold circuit 4, and each applies the gain generated thereby to the DC flow rate signal to produce an output; a gain selecting circuit 52 for selecting, as the DC flow rate signal to the A/D converting circuit 6, one of the outputs from the individual gain generating circuits 51-1 through 51-3; and saturation preventing circuits 53-2 and 53-3, connected respectively to the earlier stages of the individual gain generating circuits 51-2 and 51-3.

In the DC amplifying circuit 5A, the individual gain generating circuits 51 (51-1 through 51-3) have operational amplifiers OP (OP1 through OP3), low-pass filters LPF (LPF1 through LPF3), resistances R1 (R11 through R13), and resistances R2 (R21 through R23). If the gains generated in these individual gain generating circuits 51-1, 51-2, and 51-3, are, respectively, G1, G2, and the G3, the magnitudes of the gains are set to G1<G2<G3. That is, the gains G1, G2, and G3 of the individual gain generating circuits 51-1, 51-2, and 51-3 are established as sequentially larger values (small gain, medium gain, and large gain).

Additionally, the gain selecting circuit 52 is structured from a first switch SW1 and a second switch SW2, where the switches SW1 and SW2 are both switches that are single circuits with two contact points. In the gain selecting circuit 52, the contact point S1a of the switch SW1 is connected to an output line L1 from the individual gain generating circuit 51-1, and the contact point S1b of the switch SW1 is connected to an output line L2 from the individual gain generating circuit 51-2. Additionally, the common terminal S1c of the switch SW1 is connected to the contact point S2a of the switch SW2, and the contact point S2b of the switch SW2 is connected to an output line L3 from the individual gain generating circuit 51-3, and the contact point S2c of the switch SW2 is connected to an output line LOUT from the A/D converting circuit 6.

Moreover, the saturation preventing circuits 53 (53-2 and 53-3) are also single circuits having two contact points, as with the switches SW1 and SW2. In the saturation preventing circuit 53-2, the contact point T2a is connected to an input line LIN from the sample hold circuit 4, the contact point T2b is open, and the common terminal T2c is connected to the + side input terminal of the operational amplifier OP2 of the individual gain generating circuit 51-2. In the saturation preventing circuit 53-3, the contact point T3a is connected to an input line LIN from the sample hold circuit 4, the contact point T3b is open, and the common terminal T3c is connected to the + side input terminal of the operational amplifier OP3 of the individual gain generating circuit 51-3.

In the individual gain generating circuit 51-1 the + side input of the operational amplifier OP1 is connected directly to the input line LIN from the sample hold circuit 4. That is, the saturation preventing circuit 53 is not provided at the earlier-stage of the operational amplifier OP1. A series-connected circuit of the resistance R11 and the resistance R21 is connected to the output line from the operational amplifier OP1 to the low-pass filter LPF1, and the − side input of the operational amplifier OP1 is connected to the contact point between the resistance R11 and the resistance R21.

In the individual gain generating circuit 51-2 as well, similarly, a series-connected circuit of the resistance R12 and the resistance R22 is connected to the output line from the operational amplifier OP2 to the low-pass filter LPF2, and the − side input of the operational amplifier OP2 is connected to the contact point between the resistance R12 and the resistance R22. In the individual gain generating circuit 51-3 as well, similarly, a series-connected circuit of the resistance R13 and the resistance R23 is connected to the output line from the operational amplifier OP3 to the low-pass filter LPF3, and the − side input of the operational amplifier OP3 is connected to the contact point between the resistance R13 and the resistance R23.

In this DC amplifying circuit 5A the operations of the switches SW1 and SW2 in the gain selecting circuit 52 are controlled by gain selecting instructions sent from the processing portion 7. Moreover, the operations of the saturation preventing circuits 53-2 and 53-3 are controlled by saturation preventing operation enable/disable setting commands sent from the processing portion 7. In the present example, the instructions combining the gain selecting instructions and the saturation preventing operation enabling/disabling, setting instructions are known as the gain switching instructions from the processing portion 7A.

The processing portion 7A is achieved through hardware, including a processor and a storage device, and a program that works in conjunction with this hardware to produce various functions, and has a gain switching instructions generating function, to the DC amplifying circuit 5A, as a function that is unique to the present example. The gain switching instructions generating function of the processing portion 7A and the operation in the DC amplifying circuit 5A in accordance with that gain switching instruction will be explained below taking, as examples, a case wherein the flow rate gets larger (the flow speed increases) and a case wherein the flow rate gets smaller (the flow speed decreases).

The Example Wherein the Flow Rate Gets Larger (Wherein the Flow Speed Increases)

Small Flow Rate (Low Flow Speed)

Figure 5:
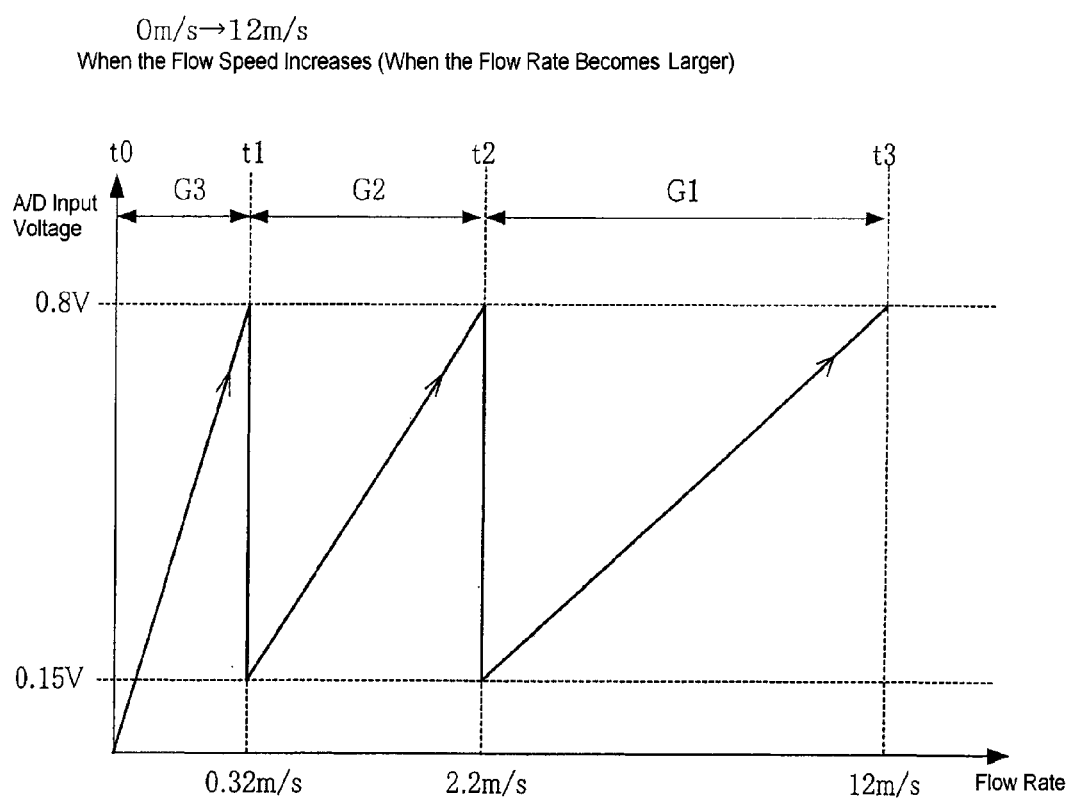
FIG. 5 is a diagram illustrating the situation wherein the switching of the input voltage to the A/D converting circuit and the switching of the gain by the DC amplifying circuit is performed when the flow rate goes up (when the flow rate increases).

At this point, the flow rate is small, where the flow speed is, for example, no more than 0.32 m/s (a point between t0 and t1, shown in FIG. 5). In this case, the processing portion 7A generates a gain switching instruction to the gain G3, which is the large gain of the gains G1, G2, and G3, and sends it to the DC amplifying circuit 5A.

In this case, the processing portion 7A sends a gain selecting instruction to the gain selecting circuit 52 for the connecting mode of the switch SW1 to the contact point S1b side and of the switch SW2 to the contact point S2b side, sends a saturation preventing operation disabling setting instruction to the saturation preventing circuit 53-2 for the connecting mode for the contact point T2a side, and sends a saturation preventing operation disabling setting instruction to the saturation preventing circuit 53-3 for the connecting mode for the contact point T3a side.

As a result, as illustrated in FIG. 2, in the gain selecting circuit 52 the switch SW1 is set to the connecting mode for the contact point S1b side, the switch SW2 is set to be connecting mode for the S2b side, the saturation preventing circuit 53-2 is set to be connecting mode for the contact point T2a side, and the saturation preventing circuit 53-3 is set to be connecting mode for the contact point T3a side.

As a result, a DC flow rate signal is inputted into the individual gain generating circuit 51-3 from the sample hold circuit 4 through the saturation preventing circuit 53-3, the gain G3 produced by the individual gain generating circuit 51-3 is applied to the DC flow rate signal, and the DC flow rate signal to which the gain G3 has been applied is outputted to the A/D converting circuit 6 of the next stage through the switch SW2 of the gain selecting circuit 52.

While in this case the DC flow rate signal is inputted also into the individual gain generating circuits 51-1 and 51-2 from the sample hold circuit 4, in the gain selecting circuit 52 the switch SW1 is set to the connecting mode for the contact point S1b side, and the switch SW2 is set to be connecting mode for the contact point S2b side, so the DC flow rate signals that are amplified by the individual gain generating circuits 51-1 and 51-2 do not pass through the gain selecting circuit 52, so are not outputted to the A/D converting circuit 6 of the next stage.

Additionally, in this case the individual gain generating circuit 51-3 is selected as the used gain generating circuit, so the output from the individual gain generating circuit 51-3 is outputted to the A/D converting circuit 6 in the next stage, but because the DC flow rate signals from the sample hold circuit 4 that are inputted into the individual gain generating circuits 51-1 and 51-2 are small, there is no saturation in the individual gain generating circuits 51-1 and 51-2.

Medium Flow Rate

When the flow rate increases and the flow speed exceeds 0.32 m/s (the point t1 shown in FIG. 5), the processing portion 7A generates a gain switching instruction to the gain G2, which is the medium gain of the gains G1, G2, and G3, and sends it to the DC amplifying circuit 5A.

In this case, the processing portion 7A sends a gain selecting instruction to the gain selecting circuit 52 for the connecting mode of the switch SW1 to the contact point S1b side and of the switch SW2 to the contact point S2a side, sends a saturation preventing operation disabling setting instruction to the saturation preventing circuit 53-2 for the connecting mode for the contact point T2a side, and sends a saturation preventing operation enabling setting instruction to the saturation preventing circuit 53-3 for the connecting mode for the contact point T3b side.

Figure 3:
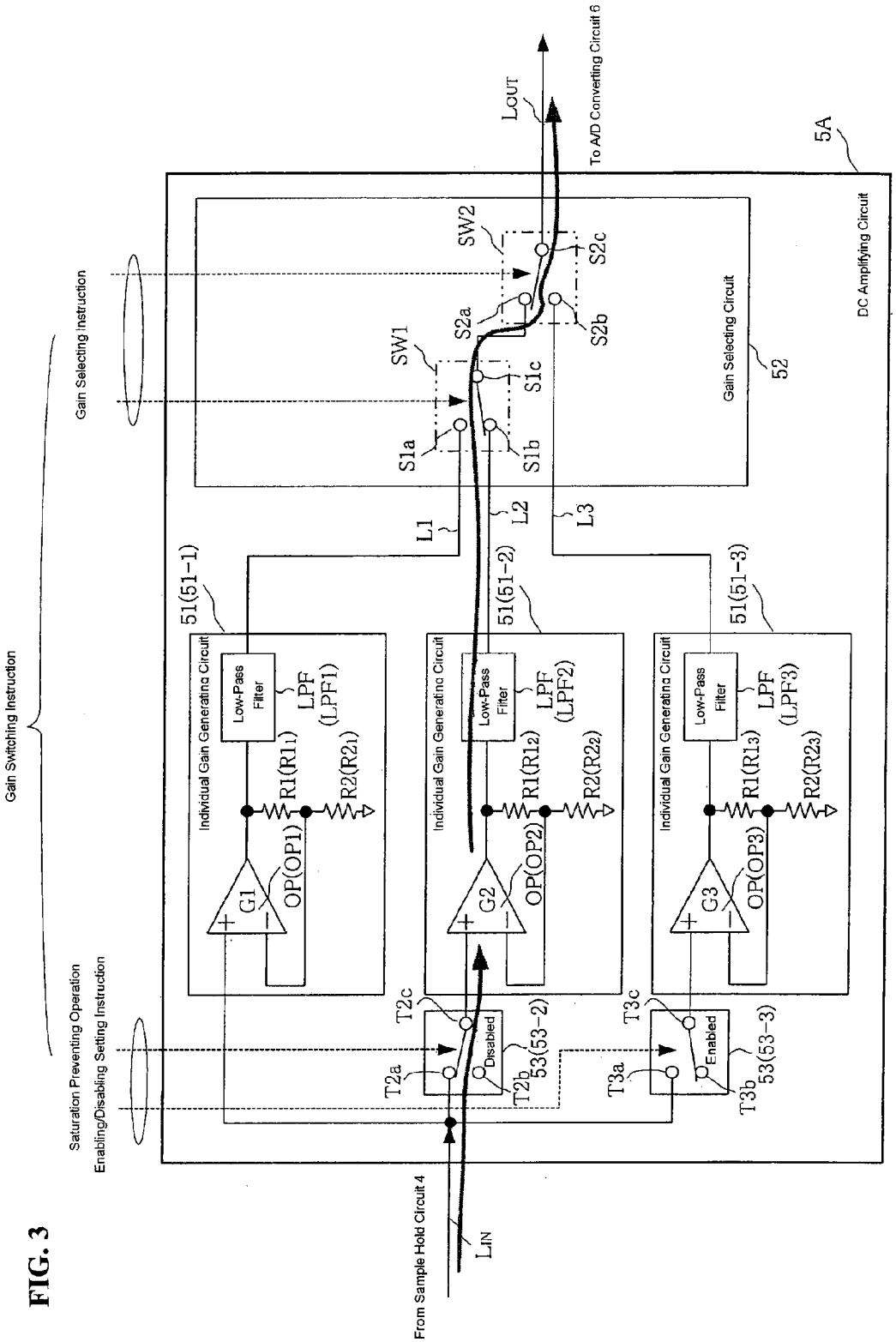
FIG. 3 is a diagram illustrating the state wherein the gain G2 is selected in the example.

As a result, as illustrated in FIG. 3, in the gain selecting circuit 52 the switch SW1 is set to the connecting mode for the contact point S1b side, the switch SW2 is set to be connecting mode for the S2a side, the saturation preventing circuit 53-2 is set to be connecting mode for the contact point T2a side, and the saturation preventing circuit 53-3 is set to be connecting mode for the contact point T3b side.

As a result, a DC flow rate signal is inputted into the individual gain generating circuit 51-2 from the sample hold circuit 4 through the saturation preventing circuit 53-2, the gain G2 produced by the individual gain generating circuit 51-2 is applied to the DC flow rate signal, and the DC flow rate signal to which the gain G2 has been applied is outputted to the A/D converting circuit 6 of the next stage through the switches SW1 and SW2 of the gain selecting circuit 52.

In this case the individual gain generating circuit 51-2 is selected as the used gain generating circuit, so the output from the individual gain generating circuit 51-2 is outputted to the A/D converting circuit 6 in the next stage, but because the saturation preventing circuit 53-3 is set to the connecting mode for the contact point T3b, input into the individual gain generating circuit 51-3 is blocked the saturation preventing operation is enabled), so there is no saturation of the individual gain generating circuit 51-3 even when the value of the DC flow rate signal from the sample hold circuit 4 becomes large.

That is, if the saturation preventing circuit 53-3 were still set to the connecting mode for the contact point side T3a (with the saturation preventing operation disabled), then because the value of the DC flow rate signal from the sample hold circuit 4 is large, the DC flow rate signal would be amplified by the large gain G3, which would cause saturation in the individual gain generating circuit 51-3. In this case, the saturation of the individual gain generating circuit 51-3 would have an effect on the input into the individual gain generating circuit 51-2, which is the used gain generating circuit, so that effect would propagate to the DC flow rate signal to the A/D converting circuit 6. So that this does not happen, in the present example, the saturation preventing operation of the saturation preventing circuit 53-3 that is provided for the individual gain generating circuit 51-3 is enabled when the individual gain generating circuit 51-2 is selected as the used gain generating circuit.

Large Flow Rate

When the flow rate increases further and the flow speed exceeds 2.2 m/s (the point t2 shown in FIG. 5), the processing portion 7A generates a gain switching instruction to the gain G1, which is the small gain of the gains G1, G2, and G3, and sends it to the DC amplifying circuit 5A.

In this case, the processing portion 7A sends a gain selecting instruction to the gain selecting circuit 52 for the connecting mode of the switch SW1 to the contact point S1a side and of the switch SW2 to the contact point S2a side, sends a saturation preventing operation enabling setting instruction to the saturation preventing circuit 53-2 for the connecting mode for the contact point T2b side, and sends a saturation preventing operation enabling setting instruction to the saturation preventing circuit 53-3 for the connecting mode for the contact point T3b side.

Figure 4:
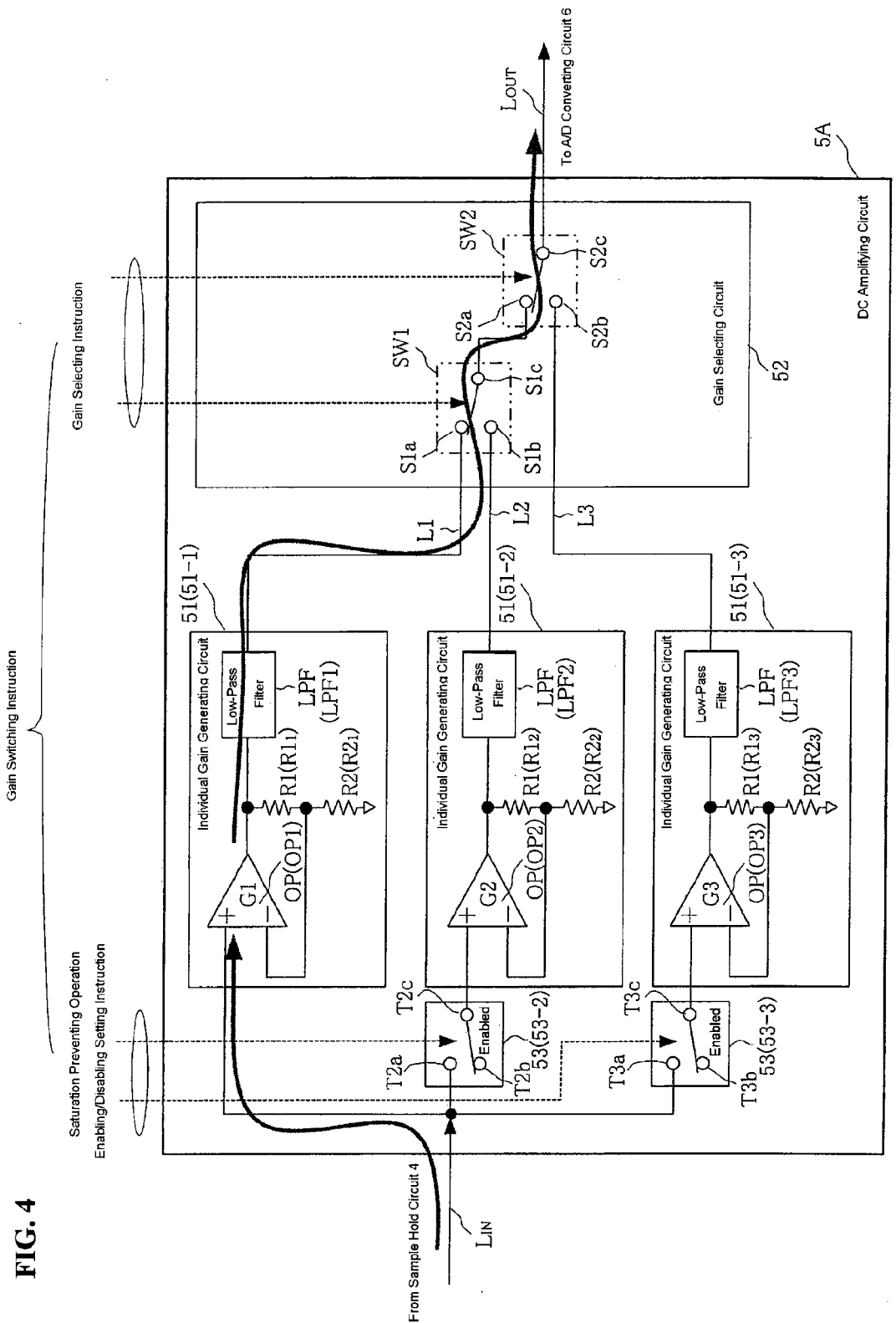
FIG. 4 is a diagram illustrating the state wherein the gain G1 is selected in the example.

As a result, as illustrated in FIG. 4, in the gain selecting circuit 52 the switch SW1 is set to the connecting mode for the contact point S1a side, the switch SW2 is set to be connecting mode for the S2a side, the saturation preventing circuit 53-2 is set to be connecting mode for the contact point T2b side, and the saturation preventing circuit 53-3 is set to be connecting mode for the contact point T3b side.

As a result, a DC flow rate signal is inputted into the individual gain generating circuit 51-1 from the sample hold circuit 4, the gain G1 produced by the individual gain generating circuit 51-1 is applied to the DC flow rate signal, and the DC flow rate signal to which the gain G1 has been applied is outputted to the A/D converting circuit 6 of the next stage through the switches SW1 and SW2 of the gain selecting circuit 52.

In this case the individual gain generating circuit 51-1 is selected as the used gain generating circuit, so the output from the individual gain generating circuit 51-1 is outputted to the A/D converting circuit 6 in the next stage, but because the saturation preventing circuit 53-2 is set to the connecting mode for the contact point T2b side, which is open, and the saturation preventing circuit 53-3 is set to the connecting mode for the contact point T3b (saturation preventing operation is enabled), there is no saturation of the individual gain generating circuits 51-2 and 51-3 even when the value of the DC flow rate signal from the sample hold circuit 4 becomes large, so there is no impact on the DC flow rate signal to the A/D converting circuit 6.

The Example Wherein the Flow Rate Gets Smaller (Wherein the Flow Speed Decreases)

Large Flow Rate (High Flow Speed)

Figure 6:
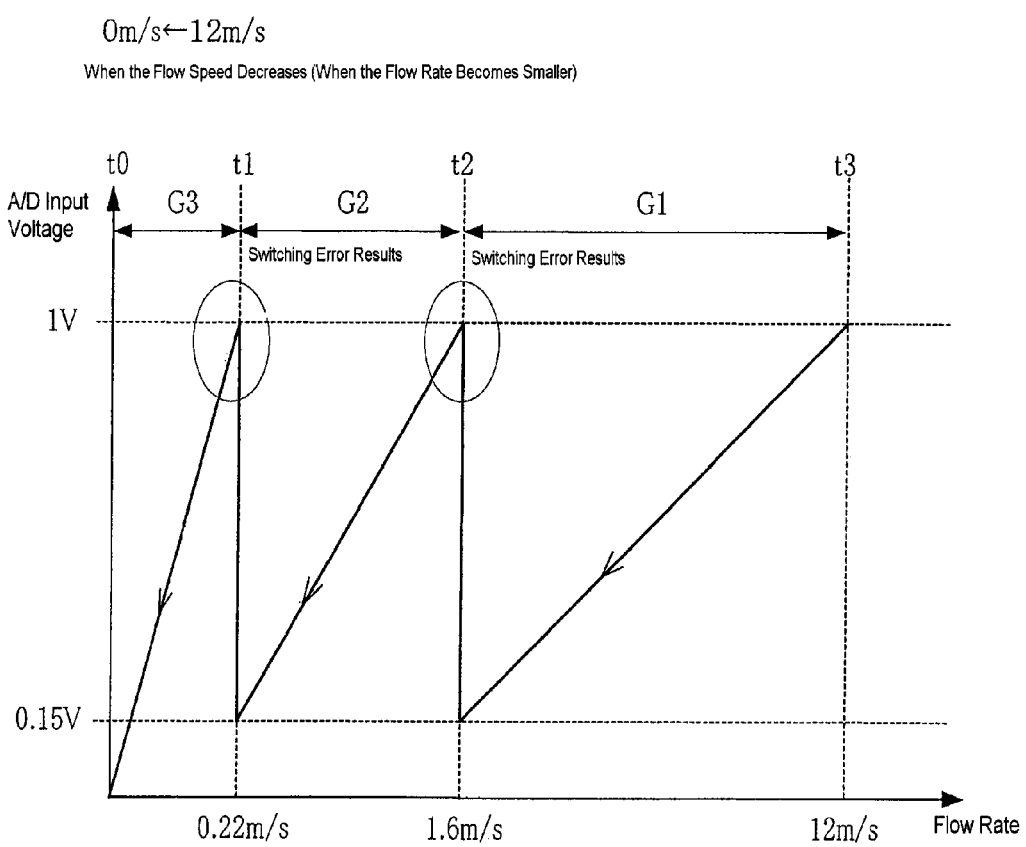
FIG. 6 is a diagram illustrating the situation wherein the switching of the input voltage to the A/D converting circuit and the switching of the gain by the DC amplifying circuit is performed when the flow rate goes down (when the flow rate decreases).

At this point, the flow rate is large, where the flow speed is, for example, no less than 1.6 m/s (a point between t2 and t3, shown in FIG. 6). In this case, the processing portion 7A generates a gain switching instruction to the gain G1, which is the small gain of the gains G1, G2, and G3, and sends it to the DC amplifying circuit 5A.

In this case, the processing portion 7A sends a gain selecting instruction to the gain selecting circuit 52 for the connecting mode of the switch SW1 to the contact point S1a side and of the switch SW2 to the contact point S2a side, sends a saturation preventing operation enabling setting instruction to the saturation preventing circuit 53-2 for the connecting mode for the contact point T2b side, and sends a saturation preventing operation enabling setting instruction to the saturation preventing circuit 53-3 for the connecting mode for the contact point T3b side.

As a result, as illustrated in FIG. 4, in the gain selecting circuit 52 the switch SW1 is set to the connecting mode for the contact point S1a side, the switch SW2 is set to be connecting mode for the S2a side, the saturation preventing circuit 53-2 is set to be connecting mode for the contact point T2b side, and the saturation preventing circuit 53-3 is set to be connecting mode for the contact point T3b side.

As a result, a DC flow rate signal is inputted into the individual gain generating circuit 51-1 from the sample hold circuit 4, the gain G1 produced by the individual gain generating circuit 51-1 is applied to the DC flow rate signal, and the DC flow rate signal to which the gain G1 has been applied is outputted to the A/D converting circuit 6 of the next stage through the switches SW1 and SW2 of the gain selecting circuit 52.

In this case the individual gain generating circuit 51-1 is selected as the used gain generating circuit, so the output from the individual gain generating circuit 51-1 is outputted to the A/D converting circuit 6 in the next stage, but because the saturation preventing circuit 53-2 is set to the connecting mode for the contact point T2b side, and the saturation preventing circuit 53-3 is set to the connecting mode for the contact point T3b (saturation preventing operation is enabled), there is no saturation of the individual gain generating circuits 51-2 and 51-3 even when the value of the DC flow rate signal from the sample hold circuit 4 becomes large, so there is no impact on the DC flow rate signal to the A/D converting circuit 6.

Medium Flow Rate

When the flow rate decreases and the flow speed falls below 1.6 m/s (the point t2 shown in FIG. 6), the processing portion 7A generates a gain switching instruction to the gain G2, which is the medium gain of the gains G1, G2, and G3, and sends it to the DC amplifying circuit 5A.

In this case, the processing portion 7A sends a gain selecting instruction to the gain selecting circuit 52 for the connecting mode of the switch SW1 to the contact point S1b side and of the switch SW2 to the contact point S2a side, sends a saturation preventing operation disabling setting instruction to the saturation preventing circuit 53-2 for the connecting mode for the contact point T2a side, and sends a saturation preventing operation enabling setting instruction to the saturation preventing circuit 53-3 for the connecting mode for the contact point T3b side.

As a result, as illustrated in FIG. 3, in the gain selecting circuit 52 the switch SW1 is set to the connecting mode for the contact point S1b side, the switch SW2 is set to be connecting mode for the S2a side, the saturation preventing circuit 53-2 is set to be connecting mode for the contact point T2a side, and the saturation preventing circuit 53-3 is set to be connecting mode for the contact point T3b side.

As a result, a DC flow rate signal is inputted into the individual gain generating circuit 51-2 from the sample hold circuit 4 through the saturation preventing circuit 53-2, the gain G2 produced by the individual gain generating circuit 51-2 is applied to the DC flow rate signal, and the DC flow rate signal to which the gain G2 has been applied is outputted to the A/D converting circuit 6 of the next stage through the switches SW1 and SW2 of the gain selecting circuit 52.

In this case the individual gain generating circuit 51-2 is selected as the used gain generating circuit, so the output from the individual gain generating circuit 51-2 is outputted to the A/D converting circuit 6 in the next stage, but because the saturation preventing circuit 53-3 is set to the connecting mode for the contact point T3*b* (saturation preventing operation is enabled), there is no saturation of the individual gain generating circuits 51-2 and 51-3 even when the value of the DC flow rate signal from the sample hold circuit 4 becomes large, so there is no impact on the DC flow rate signal to the A/D converting circuit 6.

Small Flow Rate

When the flow rate further decreases and the flow speed falls below 0.22 m/s (the point t1 shown in FIG. 6), the processing portion 7A generates a gain switching instruction to the gain G3, which is the large gain of the gains G1, G2, and G3, and sends it to the DC amplifying circuit 5A.

In this case, the processing portion 7A sends a gain selecting instruction to the gain selecting circuit 52 for the connecting mode of the switch SW1 to the contact point S1*b* side and of the switch SW2 to the contact point S2*b* side, sends a saturation preventing operation disabling setting instruction to the saturation preventing circuit 53-2 for the connecting mode for the contact point T2*a* side, and sends a saturation preventing operation disabling setting instruction to the saturation preventing circuit 53-3 for the connecting mode for the contact point T3*a* side.

As a result, as illustrated in FIG. 2, in the gain selecting circuit 52 the switch SW1 is set to the connecting mode for the contact point S1*b* side, the switch SW2 is set to be connecting mode for the S2*b* side, the saturation preventing circuit 53-2 is set to be connecting mode for the contact point T2*a* side, and the saturation preventing circuit 53-3 is set to be connecting mode for the contact point T3*a* side.

As a result, a DC flow rate signal is inputted into the individual gain generating circuit 51-3 from the sample hold circuit 4, the gain G3 produced by the individual gain generating circuit 51-3 is applied to the DC flow rate signal, and the DC flow rate signal to which the gain G3 has been applied is outputted to the A/D converting circuit 6 of the next stage through the switch SW2 of the gain selecting circuit 52.

While in this case the DC flow rate signal is inputted also into the individual gain generating circuits 51-1 and 51-2 from the sample hold circuit 4, in the gain selecting circuit 52 the switch SW1 is set to the connecting mode for the contact point S1*b* side, and the switch SW2 is set to be connecting mode for the contact point S2*b* side, so the DC flow rate signals that are amplified by the individual gain generating circuits 51-1 and 51-2 do not pass through the gain selecting circuit 52, so are not outputted to the A/D converting circuit 6 of the next stage.

Additionally, in this case the individual gain generating circuit 51-3 is selected as the used gain generating circuit, so the output from the individual gain generating circuit 51-3 is outputted to the A/D converting circuit 6 in the next stage, but because the DC flow rate signals from the sample hold circuit 4 that are inputted into the individual gain generating circuits 51-1 and 51-2 are small, there is no saturation in the individual gain generating circuits 51-1 and 51-2, and there is no effect on the DC flow rate signal to the A/D converting circuit 6.

Example Wherein a Reference Voltage is Set in the Saturation Preventing Circuit

In the previous example, in the saturation preventing circuits 53-2 and 53-3 the saturation preventing operations were enabled through setting the connecting modes to the contact point T2*b* and T3*b* sides, which were open. In this case, when switching the gain from G1 to G2 (the point t2 shown in FIG. 6) in a process wherein the flow rate becomes smaller (the flow speed becomes lower), the DC flow rate signal is inputted suddenly from the sample hold circuit 4 from a state wherein the individual gain generating circuit 51-2 was open, and thus there is a delay in the amplification process in the individual gain generating circuit 51-2, which produces switching error. Similarly, when switching the gain from G2 to G3 (the point t1 shown in FIG. 6), the DC flow rate signal is inputted suddenly from the sample hold circuit 4 from a state wherein the individual gain generating circuit 51-3 was open, and thus there is a delay in the amplification process in the individual gain generating circuit 51-3, which produces switching error.

Note that the aforementioned switching error is not produced in a process wherein the flow rate becomes larger (the flow speed becomes greater). That is, when switching the gain from G3 to G2 (the point t1 shown in FIG. 5, FIG. 2→FIG. 3) in a process wherein the flow rate becomes larger, the state is one wherein the saturation preventing operation of the saturation preventing circuit 53-2 disabled and the DC flow rate signal from the sample hold circuit 4 is already inputted into the individual gain generating circuit 51-2, and thus there is no delay in the amplification process in the individual gain generating circuit 51-2, so no switching error is produced. Similarly, when switching the gain from G2 to G1 (the point t2 shown in FIG. 5, FIG. 3→FIG. 4), the state is one wherein the DC flow rate signal is already inputted from the sample hold circuit 4 into the individual gain generating circuit 51-1, and thus there is no delay in the amplification process in the individual gain generating circuit 51-1, and no switching error will be produced.

Figure 7:
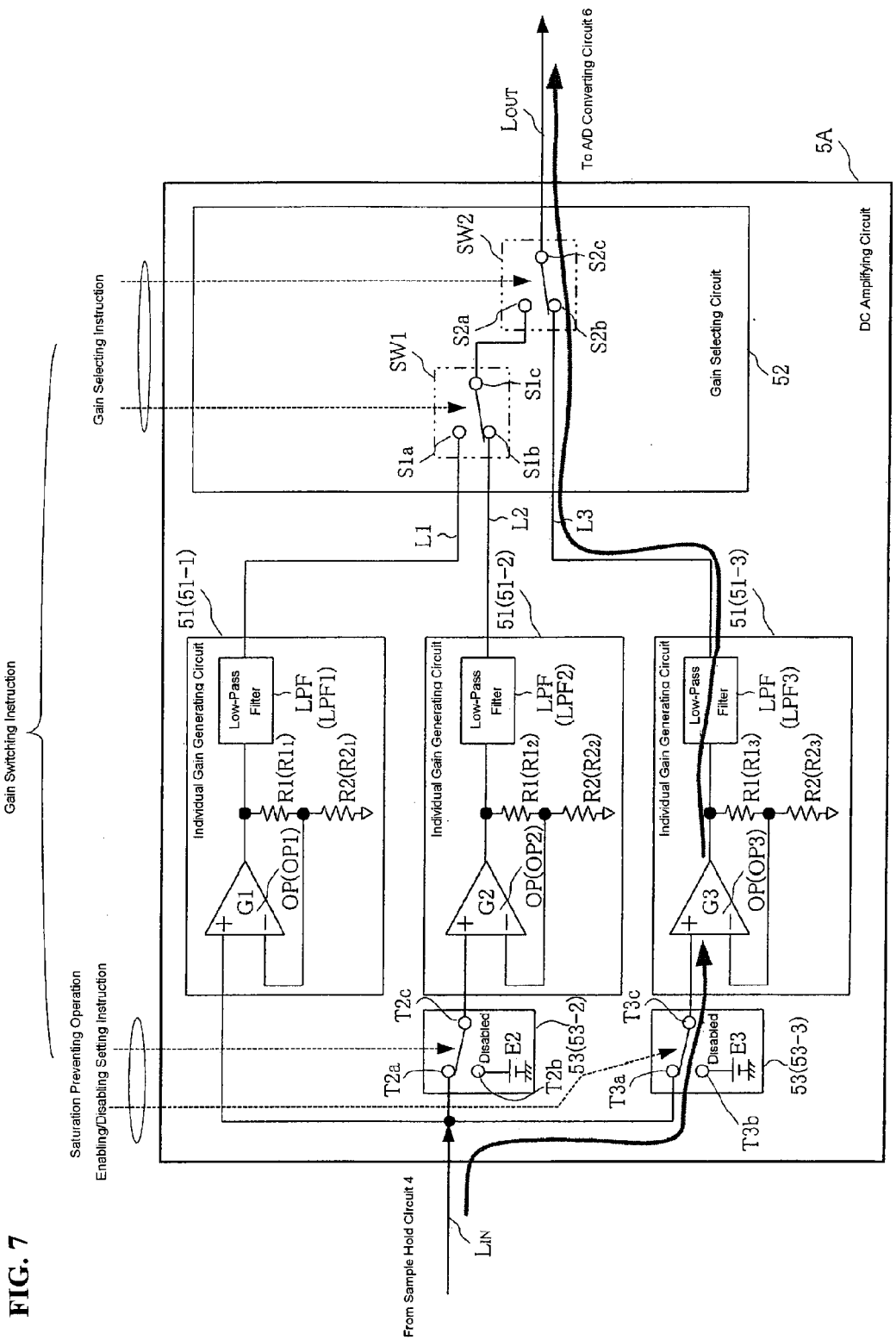
FIG. 7 is a diagram illustrating schematically the internal structure (in a state wherein the gain G3 is selected) of another example of a DC amplifying circuit in an electromagnetic flow meter according to present invention.

In this way, while there is no problem in the example above in a process wherein the flow rate is increasing, there will be switching error in a process wherein the flow rate is decreasing. Given this, in the present example a reference voltage E2 is connected to the contact point T2*b* of the saturation preventing circuit 53-2, and a reference voltage E3 is connected to the contact point T3*b* of the saturation preventing circuit 53-3, as illustrated in FIG. 7, in order to prevent the occurrence of switching error in a process wherein the flow rate is decreasing.

In this case, the reference voltage E2 in the saturation preventing circuit 53-2 is established as a value corresponding to the value of the DC flow rate signal to the individual gain generating circuit 51-1 in consideration of the value of the DC flow rate signal to the individual gain generating circuit 51-1, which is the gain generating circuit used immediately prior to the switching of the saturation preventing operation of the saturation preventing circuit 53-2 from enabled to disabled (FIG. 4→FIG. 3). That is, the reference voltage E2 is established as a value that is equal to the voltage value of the DC flow rate signal that is expected through anticipating the voltage value of the DC flow rate signal from the sample hold circuit 4 immediately prior to the used gain generating circuit being switched from the individual gain generating circuit 51-1 to the individual gain generating circuit 51-2.

Additionally, the reference voltage E3 in the saturation preventing circuit 53-3 is established as a value corresponding to the value of the DC flow rate signal to the individual gain generating circuit 51-2 in consideration of the value of the DC flow rate signal to the individual gain generating circuit 51-2, which is the gain generating circuit used immediately prior to the switching of the saturation preventing operation of the saturation preventing circuit 53-3 from enabled to disabled (FIG. 3→FIG. 2). That is, the reference voltage E3 is established as a value that is equal to the voltage value of the DC flow rate signal that is expected through anticipating the voltage value of the DC flow rate signal from the sample hold circuit 4 immediately prior to the used gain generating circuit being switched from the individual gain generating circuit 51-2 to the individual gain generating circuit 51-3.

The Example Wherein the Flow Rate Gets Smaller (Wherein the Flow Speed Decreases)

Large Flow Rate (High Flow Speed)

At this point, the flow rate is large, where the flow speed is, for example, no less than 1.6 m/s (a point between t2 and t3, shown in FIG. 6). In this case, the processing portion 7A generates a gain switching instruction to the gain G1, which is the small gain of the gains G1 G2, and G3, and sends it to the DC amplifying circuit 5A.

In this case, the processing portion 7A sends a gain selecting instruction to the gain selecting circuit 52 for the connecting mode of the switch SW1 to the contact point S1a side and of the switch SW2 to the contact point S2a side, sends a saturation preventing operation enabling setting instruction to the saturation preventing circuit 53-2 for the connecting mode for the contact point T2b side, and sends a saturation preventing operation enabling setting instruction to the saturation preventing circuit 53-3 for the connecting mode for the contact point T3b side.

Figure 9:
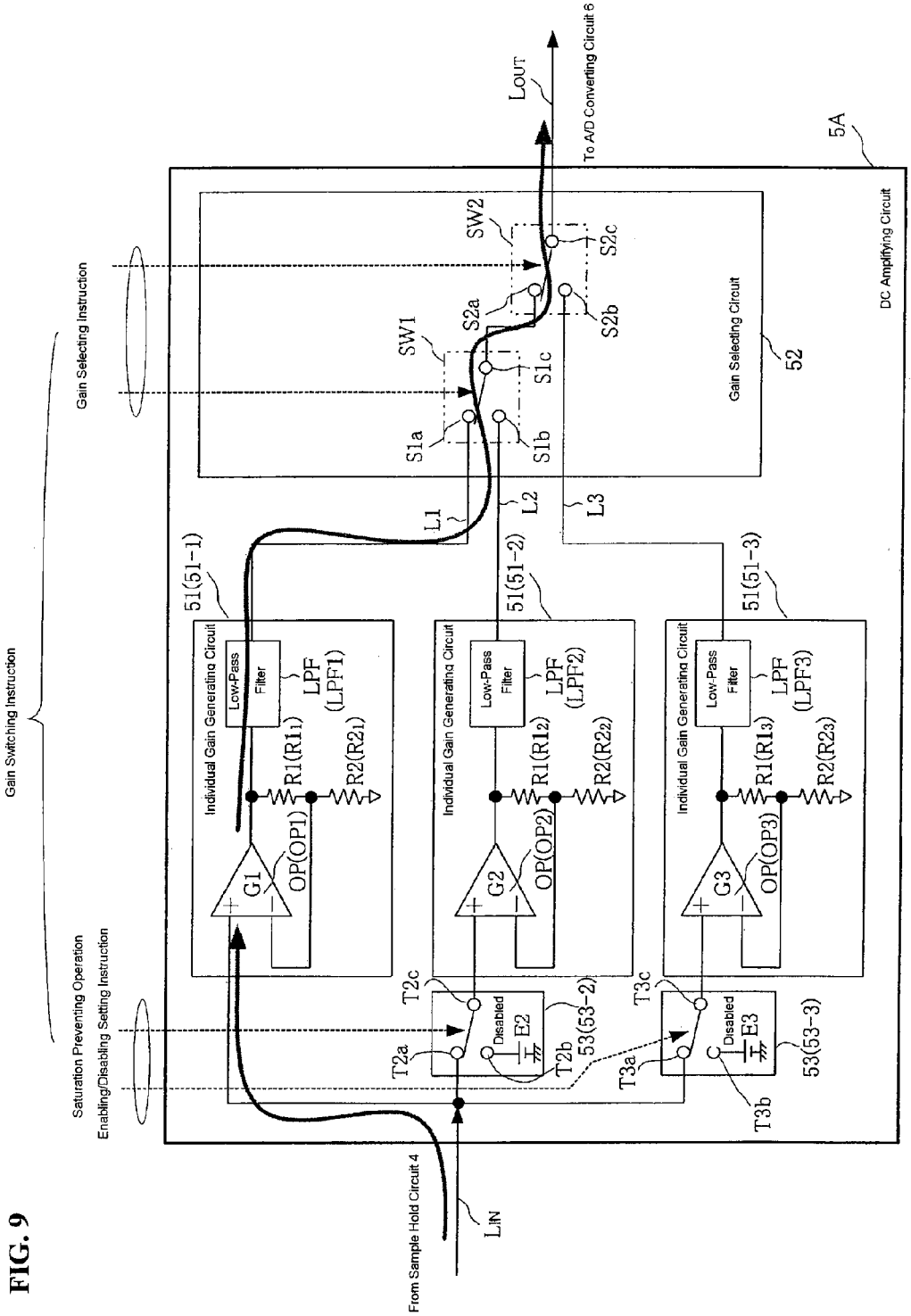
FIG. 9 is a diagram illustrating the state wherein the gain G1 is selected in the other example.

As a result, as illustrated in FIG. 9, in the gain selecting circuit 52 the switch SW1 is set to the connecting mode for the contact point S1a side, the switch SW2 is set to be connecting mode for the S2a side, the saturation preventing circuit 53-2 is set to be connecting mode for the contact point T2b side, and the saturation preventing circuit 53-3 is set to be connecting mode for the contact point T3b side.

As a result, a DC flow rate signal is inputted into the individual gain generating circuit 51-1 from the sample hold circuit 4, the gain G1 produced by the individual gain generating circuit 51-1 is applied to the DC flow rate signal, and the DC flow rate signal to which the gain G1 has been applied is outputted to the A/D converting circuit 6 of the next stage through the switches SW1 and SW2 of the gain selecting circuit 52. In this case the individual gain generating circuit 51-1 is selected as the used gain generating circuit, so the output from the individual gain generating circuit 51-1 is outputted to the A/D converting circuit 6 in the next stage, but because the saturation preventing circuit 53-2 is set to the connecting mode for the contact point T2b side, which is connected to the reference voltage E2, and the saturation preventing circuit 53-3 is set to the connecting mode for the contact point T3b (which is connected to the reference voltage E3 (saturation preventing operation is enabled), there is no saturation of the individual gain generating circuits 51-2 and 51-3 even when the value of the DC flow rate signal from the sample hold circuit 4 becomes large, so there is no impact on the DC flow rate signal to the A/D converting circuit 6.

Medium Flow Rate

When the flow rate decreases and the flow speed falls below 1.6 m/s (the point t2 shown in FIG. 6), the processing portion 7A generates a gain switching instruction to the gain G2, which is the medium gain of the gains G1 G2, and G3, and sends it to the DC amplifying circuit 5A.

In this case, the processing portion 7A sends a gain selecting instruction to the gain selecting circuit 52 for the connecting mode of the switch SW1 to the contact point S1b side and of the switch SW2 to the contact point S2a side, sends a saturation preventing operation disabling setting instruction to the saturation preventing circuit 53-2 for the connecting mode for the contact point T2a side, and sends a saturation preventing operation enabling setting instruction to the saturation preventing circuit 53-3 for the connecting mode for the contact point T3b side.

Figure 8:
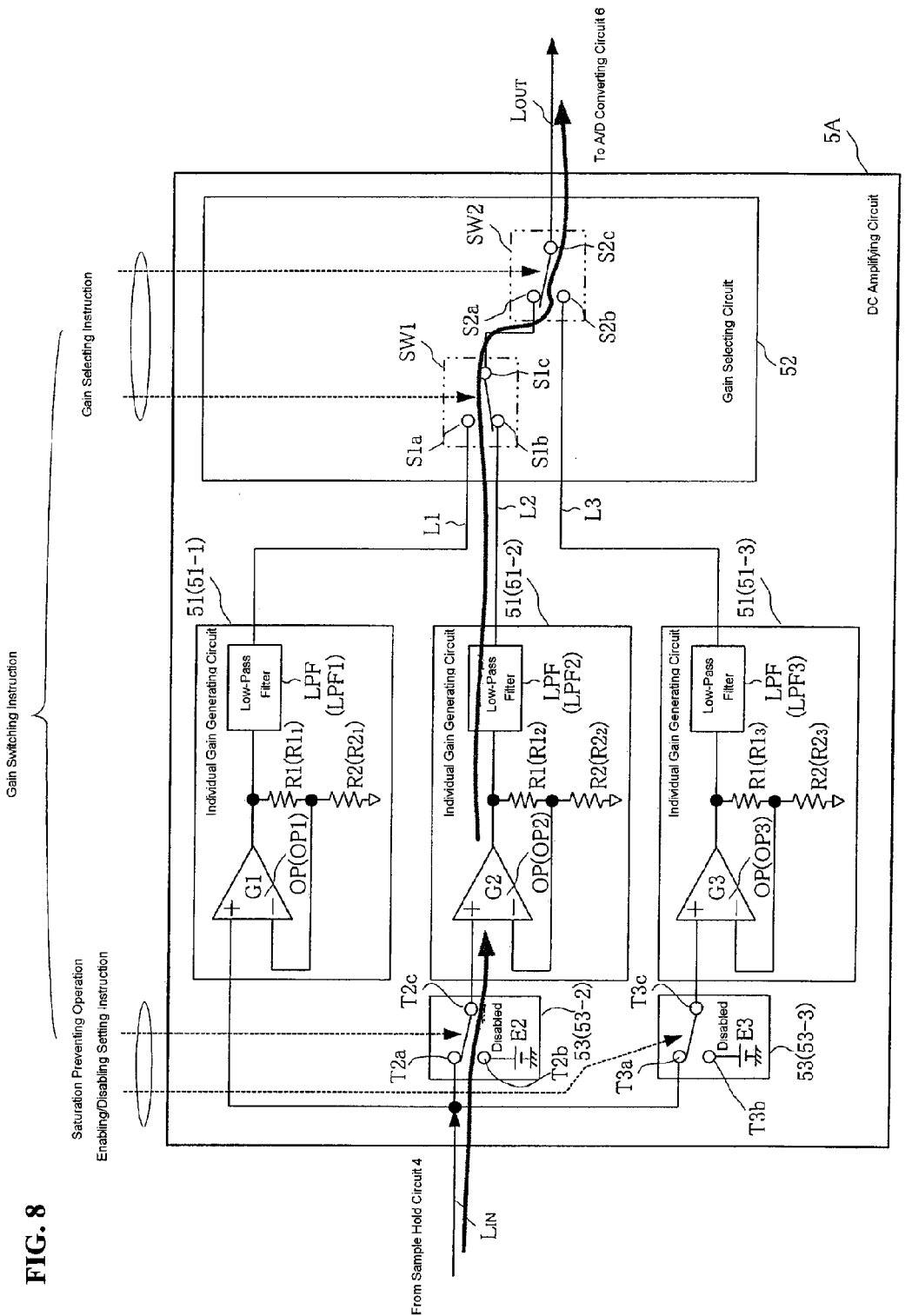
FIG. 8 is a diagram illustrating the state wherein the gain G2 is selected in the other example.

As a result, as illustrated in FIG. 8, in the gain selecting circuit 52 the switch SW1 is set to the connecting mode for the contact point S1b side, the switch SW2 is set to be connecting mode for the S2a side, the saturation preventing circuit 53-2 is set to be connecting mode for the contact point T2a side, and the saturation preventing circuit 53-3 is set to be connecting mode for the contact point T3b side.

As a result, a DC flow rate signal is inputted into the individual gain generating circuit 51-2 from the sample hold circuit 4 through the saturation preventing circuit 53-2, the gain G2 produced by the individual gain generating circuit 51-2 is applied to the DC flow rate signal, and the DC flow rate signal to which the gain G2 has been applied is outputted to the A/D converting circuit 6 of the next stage through the switches SW1 and SW2 of the gain selecting circuit 52.

In this case the individual gain generating circuit 51-2 is selected as the used gain generating circuit, so the output from the individual gain generating circuit 51-2 is outputted to the A/D converting circuit 6 in the next stage, but because the saturation preventing circuit 53-3 is set to the connecting mode for the contact point T3b which is connected to the reference voltage E3 (saturation preventing operation is enabled), there is no saturation of the individual gain generating circuits 51-2 and 51-3 even when the value of the DC flow rate signal from the sample hold circuit 4 becomes large, so there is no impact on the DC flow rate signal to the A/D converting circuit 6.

Additionally, the reference voltage E2 that is equal to the voltage level of the DC flow rate signal that was inputted immediately previously into the individual gain generating circuit 51-1 is already inputted into the individual gain generating circuit 51-2 that is selected as the used gain generating circuit, so the DC flow rate signal is inputted from the sample hold circuit 4 from the state wherein the reference voltage E2 is already inputted, and thus there is no delay in the amplification process in the individual gain generating circuit 51-2, so no switching error is produced.

Small Flow Rate

When the flow rate further decreases and the flow speed falls below 0.22 m/s (the point t1 shown in FIG. 6), the processing portion 7A generates a gain switching instruction to the gain G3, which is the large gain of the gains G1, G2, and G3, and sends it to the DC amplifying circuit 5A.

In this case, the processing portion 7A sends a gain selecting instruction to the gain selecting circuit 52 for the connecting mode of the switch SW1 to the contact point S1b side and of the switch SW2 to the contact point S2b side, sends a saturation preventing operation disabling setting instruction to the saturation preventing circuit 53-2 for the connecting mode for the contact point T2a side, and sends a saturation preventing operation disabling setting instruction to the saturation preventing circuit 53-3 for the connecting mode for the contact point T3a side.

As a result, as illustrated in FIG. 7, in the gain selecting circuit 52 the switch SW1 is set to the connecting mode for the contact point S1b side, the switch SW2 is set to be connecting mode for the S2b side, the saturation preventing circuit 53-2 is set to be connecting mode for the contact point T2a side, and the saturation preventing circuit 53-3 is set to be connecting mode for the contact point T3a side.

As a result, a DC flow rate signal is inputted into the individual gain generating circuit 51-3 from the sample hold circuit 4, the gain (B produced by the individual gain generating circuit 51-3 is applied to the DC flow rate signal, and the DC flow rate signal to which the gain G3 has been applied is outputted to the A/D converting circuit 6 of the next stage through the switch SW2 of the gain selecting circuit 52.

While in this case the DC flow rate signal is inputted also into the individual gain generating circuits 51-1 and 51-2 from the sample hold circuit 4, in the gain selecting circuit 52 the switch SW1 is set to the connecting mode for the contact point S1*b* side, and the switch SW2 is set to be connecting mode for the contact point S2*b* side, so the DC flow rate signals that are amplified by the individual gain generating circuits 51-1 and 51-2 do not pass through the gain selecting circuit 52, so are not outputted to the AD converting circuit 6 of the next stage.

Additionally, in this case the individual gain generating circuit 51-3 is selected as the used gain generating circuit, so the output from the individual gain generating circuit 51-3 is outputted to the A/D converting circuit 6 in the next stage, but because the DC flow rate signals from the sample hold circuit 4 that are inputted into the individual gain generating circuits 51-1 and 51-2 are small, there is no saturation in the individual gain generating circuits 51-1 and 51-2, and there is no effect on the DC flow rate signal to the A/D converting circuit 6.

Additionally, the reference voltage E3 that is equal to the voltage level of the DC flow rate signal that was inputted immediately previously into the individual gain generating circuit 51-2 is already inputted into the individual gain generating circuit 51-3 that will be selected as the used gain generating circuit, so the DC flow rate signal is inputted from the sample hold circuit 4 from the state wherein the reference voltage E3 is already inputted, and thus there is no delay in the amplification process in the individual gain generating circuit 51-3, so no switching error is produced.

As is understood from the explanation above, in the electromagnetic flow meter according to the present example the gain switching is performed by the DC amplifying circuit 5A instead of by the AC amplifying circuit 3. Additionally, the control of the enabling/disabling of the saturation preventing operations of the saturation preventing circuits 53-2 and 53-3, and the selecting operation for the gain selecting circuit 52, by the DC amplifying circuit 5A makes it possible to prevent the occurrence of saturation in the individual gain generating circuits that generate higher gains than the gain generated by the used gain generating circuit. Doing so causes constant amplification by the AC amplifying circuit 3 and prevents the occurrence of saturation in both the AC amplifying circuit 3 and the DC amplifying circuit 5A, thereby enabling an increase in the accuracy of the measured flow rate.

Note that while in the example set forth above, the number of switchable gains was 3, the number of switchable gains may instead be 2, or the number of gains may be further increased. In this case, first through Nth (where N≥2) individual gain generating circuits 51, wherein the gains thereof are established so as to be sequentially increasing values are provided, and respective individual saturation preventing circuits 53 are provided as the previous stages for all of the individual gain generating circuits 51 with the exception of the first individual gain generating circuit 51 with the smallest gain. Additionally, when the selecting operation by the gain selecting circuit 52 is controlled by the processing portion 7, the individual gain generating circuit 51 with the output thereof selected by the gain selecting circuit 52 is set as the used gain generating circuit, and the saturation preventing operations of the saturation preventing circuits 53 that are connected to the individual gain generating circuits 51 that generate gains equal to or less than the gain generated by the used gain generating circuit are set to disabled, and the saturation preventing operations of the other saturation preventing circuits 53 are set to enabled.

Note that in the examples set forth above, there is no individual gain generating circuit that generates a gain that is less than that of the individual gain generating circuit 51-1, and thus the individual gain generating circuit 51-1 does become saturated. Because of this, in the examples set forth above, no saturation preventing circuit 53 is provided for the individual gain generating circuit 51-1. However, in a modified example, a saturation preventing circuit 53 may be provided in a stage previous to the individual gain generating circuit 51-1, in the same manner as for the individual gain generating circuits 51-2 and 51-3. In the examples set forth above, the lack of provision of the saturation preventing circuit 53 for the individual gain generating circuit 51-1 enables the circuit to be made simpler and less expensively to that degree.

The electromagnetic flow meter according to the present invention can be used in a variety of fields, such as process control, as a flow meter for measuring the flow rate of a fluid flowing in a pipe.

The invention claimed is:

1. An electromagnetic flow meter comprising:
    a magnetic excitation coil arranged so that the direction in which the magnetic field thereof is produced is perpendicular to the direction of flow of a fluid flowing within a measuring tube;
    a magnetic excitation device providing a magnetic excitation electric current to the magnetic excitation coil with the polarity thereof switching alternatingly;
    a pair of electrodes disposed within the measuring tube perpendicular to the direction of flow of the fluid flowing within the measuring tube and to the direction of the magnetic field produced by the magnetic excitation coil;
    a differential amplifier performing differential amplification of a signal EMF produced between the electrodes, to produce an AC flow rate signal;
    an AC amplifier amplifying the AC flow rate signal from the differential amplifier;
    a sampler sampling the AC flow rate signal that has been amplified by the AC amplifier, to produce a DC flow rate signal;
    a DC amplifier amplifying the DC flow rate signal from the sampler;
    an A/D converter converting into a digital signal the DC flow rate signal amplified by the DC amplifier; and
    a processor calculating a flow rate of the fluid flowing within the measuring tube from the digital signal converted by the A/D converter;
    wherein the DC amplifier comprises:
        first through Nth (where N≥2) individual gain generators inputting individually the DC flow rate signal from the sampler and for applying, to the DC flow rate signal, the gain produced thereby, established so that the gains of the first through Nth individual gain generators applied to the DC flow rate signal are as sequentially larger values;
        a gain selector selecting, as the DC flow rate signal to the A/D converter, one of the outputs from the first through Nth individual gain generators; and
        a saturation preventer preventing the occurrence of saturation in a later stage individual gain generator, connected to all of the earlier-stage individual gain generators of the first through Nth individual gain generators except for the first individual gain generator; and
    wherein the processor comprises:
        a controller controlling enabling/disabling of the saturation preventing operation of the saturation preventer in the DC amplifier and for controlling a selecting operation of the gain selector, based on the calculated flow rate of the fluid.

2. The electromagnetic flow meter as set forth in claim 1, wherein the controller, when controlling the selecting operation by the gain selector, sets the individual gain generators with the output thereof selected by the gain selector as the used gain generator, sets to disabled the saturation preventing operations of the saturation preventer that are connected to the individual gain generators that generate gains equal to or less than the gain generated by the used gain generator, and set to enabled the saturation preventing operations of the other saturation preventer.

3. The electromagnetic flow meter as set forth in claim 2, wherein:
   the saturation preventer set a state wherein the saturation preventing operation in a state wherein the DC flow rate signal from the sampler is applied to a later-stage individual gain generator is disabled, and set a state wherein the saturation preventing operation in a state wherein a reference voltage, which is set in advance, is applied to the individual gain generator is enabled; and
   the value of the reference voltage in the saturation preventer is established as a value corresponding to the value of the DC flow rate signal to the used gain generator immediately prior to the saturation preventing operation thereof switching from enabled to disabled.

4. The electromagnetic flow meter as set forth in claim 1, wherein the saturation preventers are connected also to a stage prior to the first individual gain generators.

* * * * *